US009053409B2

(12) United States Patent
Takeishi

(10) Patent No.: US 9,053,409 B2
(45) Date of Patent: Jun. 9, 2015

(54) IMAGE FORMING APPARATUS, METHOD, AND PROGRAM PRODUCT DETERMINING PERIODIC DRAWING PATTERN AND THINNING AN IMAGE

(71) Applicant: CANON KABUSHIKI KAISHA, Tokyo (JP)

(72) Inventor: Hiroki Takeishi, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/302,048

(22) Filed: Jun. 11, 2014

(65) Prior Publication Data
US 2014/0368888 A1 Dec. 18, 2014

(30) Foreign Application Priority Data
Jun. 18, 2013 (JP) .................................. 2013-127780

(51) Int. Cl.
*H04N 1/387* (2006.01)
*H04N 1/40* (2006.01)
*G06K 9/44* (2006.01)
*G06K 15/00* (2006.01)
*G06T 5/00* (2006.01)
*G06K 15/02* (2006.01)

(52) U.S. Cl.
CPC .................................. *G06K 15/1871* (2013.01)

(58) Field of Classification Search
None
See application file for complete search history.

(56) References Cited

U.S. PATENT DOCUMENTS

| 7,236,642 | B2 * | 6/2007 | Ahrens et al. | 382/261 |
| 7,827,485 | B2 * | 11/2010 | Bourdev | 715/273 |
| 8,159,694 | B2 | 4/2012 | Yabe | |
| 8,208,169 | B2 * | 6/2012 | Clark et al. | 358/1.9 |
| 8,538,199 | B2 * | 9/2013 | Ernst et al. | 382/298 |
| 8,897,596 | B1 * | 11/2014 | Passmore et al. | 382/284 |
| 2011/0292462 | A1 * | 12/2011 | Yamanaka | 358/448 |

FOREIGN PATENT DOCUMENTS

| JP | 2007-27826 | 2/2007 |
| JP | 2009-110427 | 5/2009 |

OTHER PUBLICATIONS

"PostScript Language Reference Manual Second Edition", Adobe Systems Incorporated, Chapter 6.3, pp. 307-309 (1990).

* cited by examiner

*Primary Examiner* — Scott A Rogers
(74) *Attorney, Agent, or Firm* — Fitzpatrick, Cella, Harper & Scinto

(57) ABSTRACT

The present invention is an image forming apparatus for interpreting data to generate intermediate data and the image forming apparatus includes: a unit configured to determine whether or not there is a periodic drawing pattern in data; a unit configured to determine whether or not there is a reduction command in data; a unit configured to obtain a ratio between the number of pitches of the period of the drawing pattern and a reduction ratio included in the reduction command; a unit configured to determine whether or not the ratio and a value in a table loaded by the image forming apparatus coincide with each other; and a unit configured to reduce, in the case where it is determined that the ratio coincides with a value in the table, an image by dividing the image into cells and performing thinning processing in units of cells.

6 Claims, 19 Drawing Sheets

| RATIO |
|---|
| 1.0 |
| 2.0 |
| 3.0 |
| ... |

FIG.14

| PATTERN | | | | | | | | | PITCH |
|---|---|---|---|---|---|---|---|---|---|
| 1 | 0 | | | | | | | | 2 |
| 1 | * | 0 | | | | | | | 3 |
| 1 | * | * | 0 | | | | | | 4 |

FIG.15

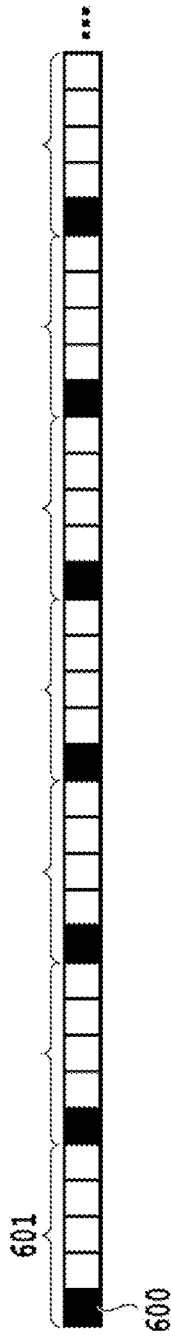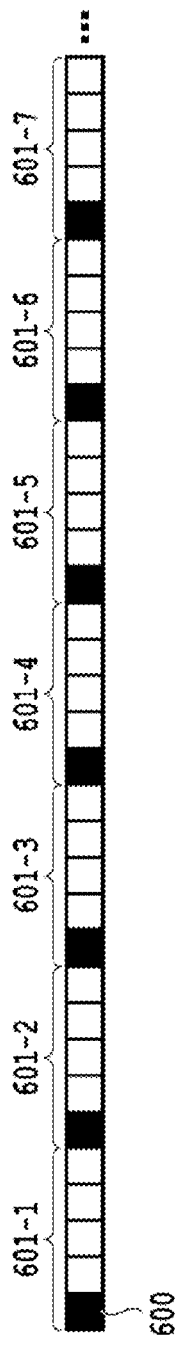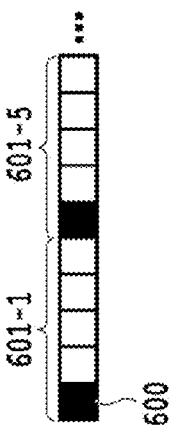

IMAGE FORMING APPARATUS, METHOD, AND PROGRAM PRODUCT DETERMINING PERIODIC DRAWING PATTERN AND THINNING AN IMAGE

BACKGROUND OF THE INVENTION

1. Field of the Invention

The present invention relates to an image forming apparatus, an image processing method, and a medium.

Particularly, the present invention relates to an image forming apparatus for receiving print data transmitted from a host computer and forming an image after performing image processing, an image processing method, and a medium for implementing the image processing method.

2. Description of the Related Art

In recent years, it is made possible to draw an object in the front plane translucent so that an object drawn in the back plane shows through in applications and OS of a host computer. As one of methods for drawing an object in the front plane translucent, the method for thinning the object in the front plane into the form of a checkered pattern is known (see Japanese Patent Laid-Open No. 2009-110427).

An image forming apparatus having received print data generated by this method interprets the print data represented by the page description language (abbreviated to "PDL" in the present specification. As to the technical information of the PDL, see particularly Chapter 6.3: Transfer Functions of "PostScript Language Reference Manual SECOND EDITION"). Then, based on the result of interpretation, the image forming apparatus performs image processing, such as enlargement/reduction processing, and generates bitmap data for printing (see particularly Chapter 6.3: Transfer Functions of "PostScript Language Reference Manual SECOND EDITION").

Further, as the enlargement/reduction processing on the image data, such as bitmap data, thinning processing is known. The thinning processing is processing to reduce the number of pixels of target image data by pulling out the pixels of a target image in accordance with a reduction ratio. As the enlargement/reduction processing on print data thinned into the form of a checkered pattern, the technique to perform enlargement/reduction processing by obtaining an average density is known (see Japanese Patent Laid-Open No. 2007-27826).

SUMMARY OF THE INVENTION

The conventional technique described above is explained by using Microsoft PowerPoint® as an example with reference to FIG. 1.

In the case where a gray object is drawn additionally in such a manner as indicated by symbol 101b in FIG. 1 in the front plane of characters (abcdefgh) indicated by symbol 101a in FIG. 1, the characters in the back plane are hidden, and therefore, not visible.

In contrast to this, in the case where a gray object specified to be drawn translucent is drawn additionally in such a manner as indicated by symbol 101d in FIG. 1 in the front plane of the characters indicated by symbol 101a in FIG. 1, the characters in the back plane show through.

In the case where a user uses PowerPoint, it is possible to specify translucency by performing the following operation. The user specifies gray in "Color" of "Fill" in "Format AutoShape" of PowerPoint and at the same time, selects a percentage in "Transparency" to specify translucency. Due to this, it is possible to perform settings so that the characters in the back plane of the gray object show through.

It is also possible to specify a gradation object to be drawn translucent as indicated by symbol 101c in FIG. 1. In other words, by specifying the gradation object to be drawn translucent as indicated by symbol 101e in FIG. 1, it is possible for a user to perform settings so that characters in the back plane show through at the time of use of PowerPoint.

The application capable of specifying translucency as described above is not limited to PowerPoint. It is possible to specify translucency in a variety of WYSIWYG applications at present.

Actually, an object specified to be drawn translucent is drawn as shown in FIG. 2.

First, an object 302 is drawn on a background 301 on which nothing is drawn by "overwrite" processing of RasterOPeration (abbreviated to "ROP" in the present specification), which is one of representations by the GDI command. The ROP is a drawing method for superimposing two or more objects by bit operations. The "overwrite" processing is processing by which an object that overlaps another is always effective.

Next, a gray object 303 specified to be drawn translucent is drawn by "XOR" processing of the ROP. The "XOR" processing is processing to perform operations of each bit of objects to be superimposed by XOR.

Next, a translucent pattern object 304 is drawn by "AND" processing of the ROP. The "AND" processing is processing to perform operations of each bit of objects to be superimposed by AND.

Finally, a gray object 305 specified to be drawn translucent equivalent to the gray object 303 specified to be drawn translucent is drawn again by the "XOR" processing of the ROP.

By the above-described series of processing, the white portion of the translucent pattern object 304 is drawn on the gray object 303 or 305 specified to be drawn translucent and the black portion of the translucent pattern object 304 is drawn on the object 302, and thus, a drawing result 306 is obtained. In this manner, a drawing result in which characters included in the object 302 show through is obtained.

Here, the case where the enlargement/reduction processing is performed on the drawing result 306, specifically, the case where the reduction processing by thinning is performed is further explained with reference to FIG. 3. In printing of PowerPoint, the enlargement/reduction processing is performed, for example, in the case where the operation or the setting, such as imposition (page fitting) processing, is performed. The imposition processing is processing to perform printing after reducing the whole of a drawing on a page and allocating a plurality of pages on one piece of paper. In the reduction processing represented by the imposition processing, for example, reduction processing is performed by a magnification of ½ and the reduction processing is also performed on the translucent drawing result 306 described above.

The enlargement/reduction processing has problems as below. As described above, the translucent pattern is implemented by periodic drawing processing on a space represented by a checkered pattern. In the enlargement/reduction processing on the result of the periodic drawing processing such as this, there is a possibility that an image is not drawn correctly. For example, in the case where the period of sampling by the thinning reduction processing coincides with the period of the periodic drawing pattern of a checkered pattern, or in the case where the period of sampling is a rational number multiple of the period of the periodic drawing pattern of a checkered pattern, a problem as below may occur. In this case, the result of reduction of the periodic drawing pattern of a checkered pattern does not reproduce the original periodic drawing pattern and there is a case where the average density differs or a case where drawing omission occurs (see symbol 307 in FIG. 3). This phenomenon is a conventionally existing problem and a publicly-known phenomenon called deterioration in image due to interference, aliasing noise, or aliasing.

In other words, in the conventional technique, there is such a problem that the quality in drawing may be deteriorated by interference between the drawing processing and the enlargement/reduction processing of a spatial periodicity drawing object represented by a translucent pattern object.

In the above explanation, the case of monochrome printing is used as an example. In this example, there is such a problem that the printing result different from the drawing result intended by a user, or the printing result in which there is a difference in density is obtained. In other words, drawing omission as indicated by symbol 307 in FIG. 3 occurs. Further, in the case of color printing, there is further such a problem that a color dot to be printed is not formed in the position where the color dot is to be printed, and therefore, the color tone also changes.

As measures against these problems, in Japanese Patent Laid-Open No. 2009-110427, at the time of printing of an object specified to be drawn translucent, whether printing is performed with the density with which printing is to be performed originally is checked and in the case where such printing is not performed, a warning is issued. However, even in the case where the method described in Japanese Patent Laid-Open No. 2009-110427 is used, there is such a problem that the object is not printed with the density intended by a user. It is possible, however, to avoid this problem by performing the publicly-known antialiasing processing.

However, the antialiasing processing takes a fixed processing time and has such a problem that the rate of image processing accompanying printing is reduced. Similarly, the method described in Japanese Patent Laid-Open No. 2009-110427, which prevents interference between translucency processing and reduction processing by obtaining an average density, has also such a problem that the rate of image processing accompanying printing is reduced as in the antialiasing processing.

The present invention has been made in view of the above-described problems. An object of the present invention is to prevent a deterioration in the quality of drawing caused by interference between a spatial periodicity drawing object represented by a translucent pattern object and a dither pattern (e.g., interference between translucency processing and reduction processing). At the same time, another object of the present invention is to implement image processing the rate of which is higher than that of the antialiasing and processing to obtain an average density of the conventional technique.

The present invention is an image forming apparatus for interpreting data to generate intermediate data, the image forming apparatus including: a unit configured to determine whether or not there is a periodic drawing pattern in data; a unit configured to determine whether or not there is a reduction command in data; a unit configured to obtain a ratio between the number of pitches of the period of the drawing pattern and a reduction ratio included in the reduction command in the case where it is determined that there is a periodic drawing pattern in data and that there is a reduction command in data; a unit configured to determine whether or not the ratio and a value in a table loaded by the image forming apparatus coincide with each other; and a unit configured to reduce an image by performing thinning processing in units of cells after diving the image into cells in the case where the ratio coincides with a value in the table.

The effect of the present invention is as follows.

Firstly, it is possible to prevent a problem of a deterioration in the quality of drawing in the case where drawing processing of a spatial periodicity drawing object and enlargement/reduction processing interfere.

Secondly, it is possible to prevent the problem of a deterioration in the quality of drawing while performing high-rate thinning processing in reduction processing. In other words, it is possible for the present invention to improve image quality while using thinning processing whose rate is higher than that of the antialiasing processing and the processing to obtain an average density of the conventional technique.

Further features of the present invention will become apparent from the following description of exemplary embodiments (with reference to the attached drawings).

BRIEF DESCRIPTION OF THE DRAWINGS

FIG. 14 is a diagram showing an interference ratio table according to the embodiment 1 of the present invention;

FIG. 15 is a diagram showing a table saving a pattern of a periodic drawing according to the embodiment 1 of present invention;

FIG. 17A, FIG. 17B, and FIG. 17C are diagrams for explaining reduction processing by thinning according to the embodiment 1 of the present invention;

DESCRIPTION OF THE EMBODIMENTS

Hereinafter, the best mode for carrying out the present invention is explained with reference to the drawings.
[Embodiment 1]
[Outline of Embodiment]

A first embodiment (embodiment 1) of the present invention is explained in the following order.

Firstly, a connection configuration of a printer and a host computer and an outline of printing processing in the connection configuration are explained.

Secondly, PDL data generated by the host computer and processed by the printer is explained. At the same time, how a periodic drawing pattern is represented using PDL data is explained.

Thirdly, how the printer performs printing processing using PDL data is explained. At the same time, how the printer processes a periodic drawing object included in PDL data is explained.

Finally, the effect of the present embodiment is explained.
[Explanation of Connection Configuration of Host Computer and Printer and Printing Processing]

Figure 1:
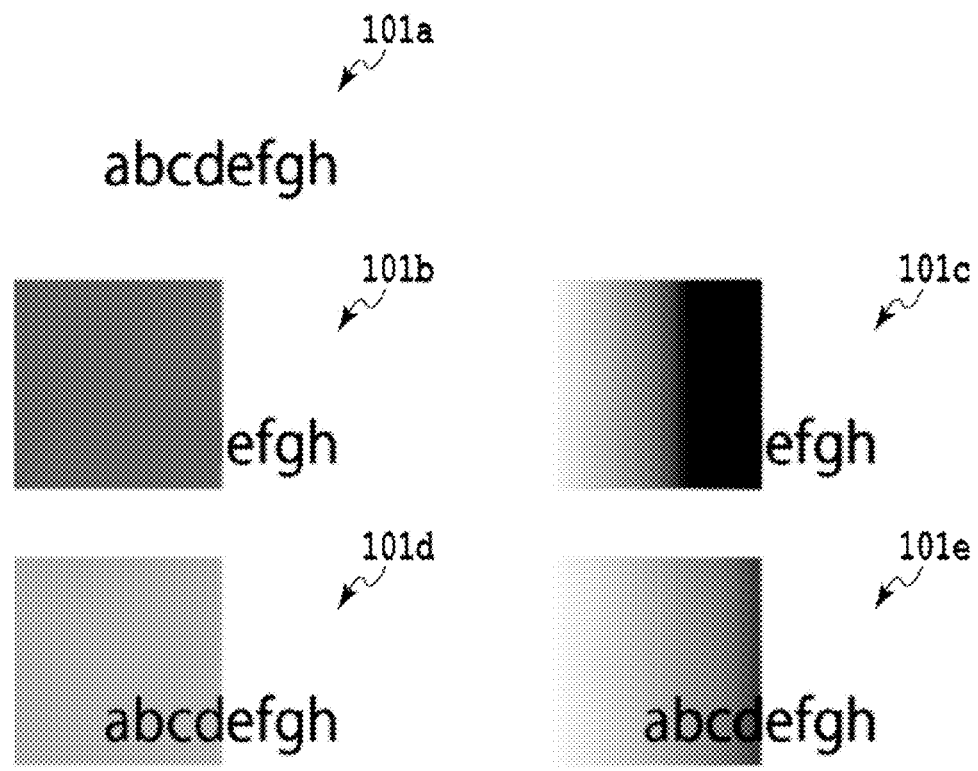
FIG. 1 is a diagram for explaining an object capable of being specified to be drawn translucent.
Figure 2:
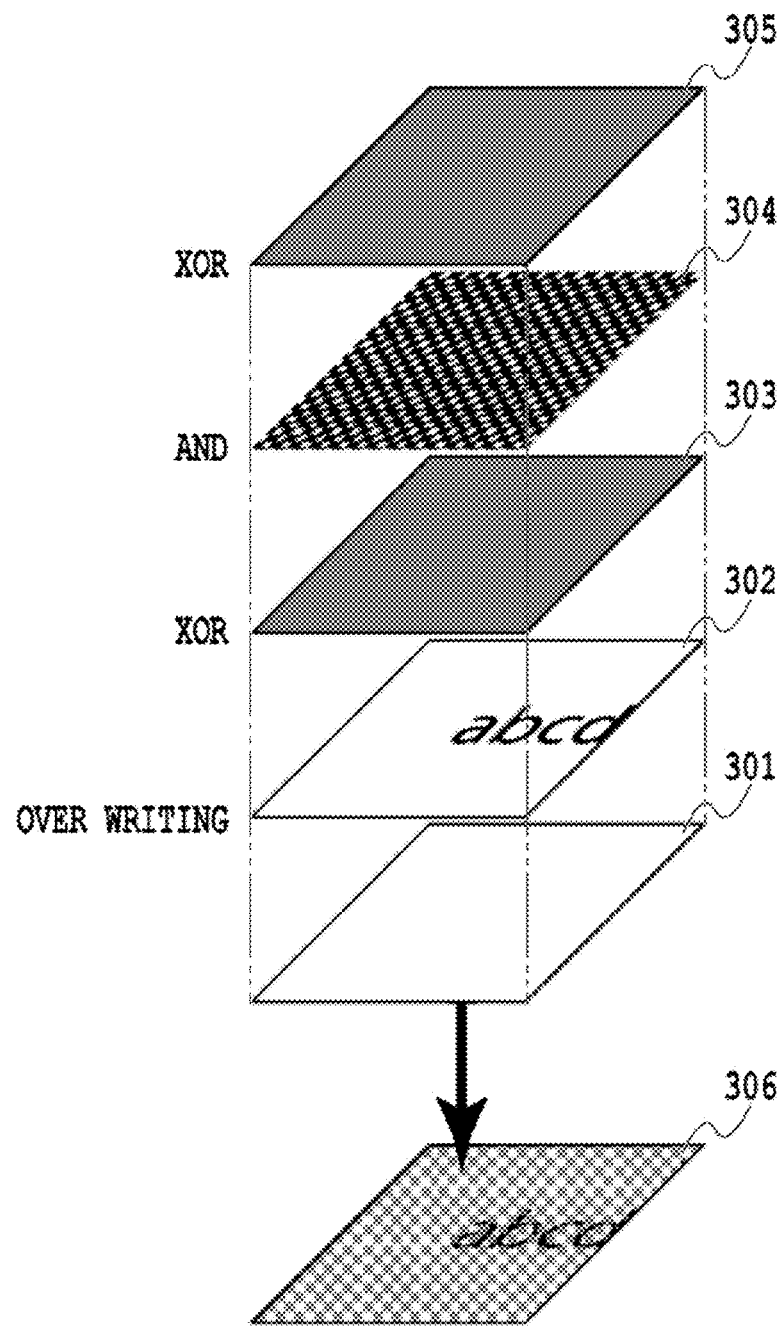
FIG. 2 is a diagram for explaining a drawing method of an object specified to be drawn translucent.
Figure 3:
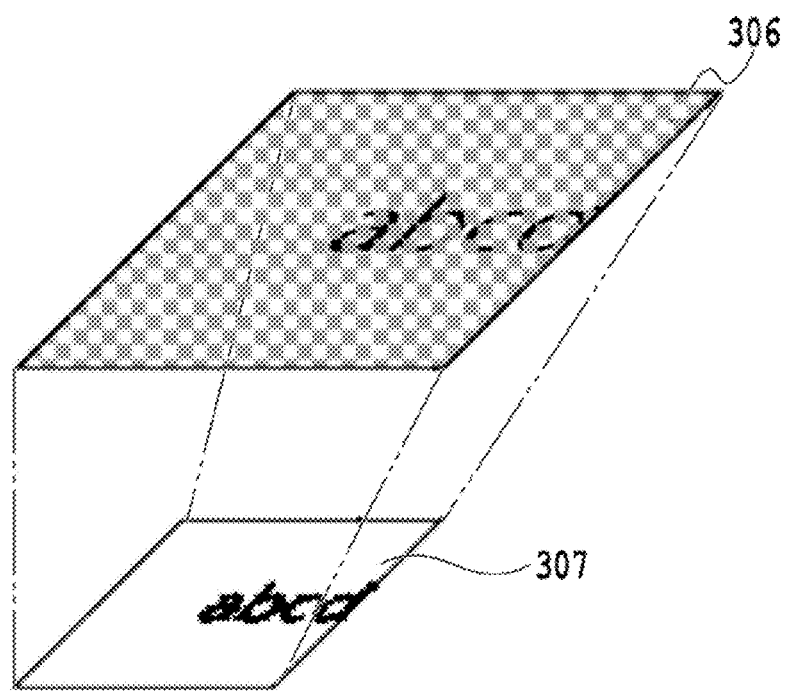
FIG. 3 is a diagram for explaining drawing of an object specified to be drawn translucent and specified to be enlarged/reduced.
Figure 4:
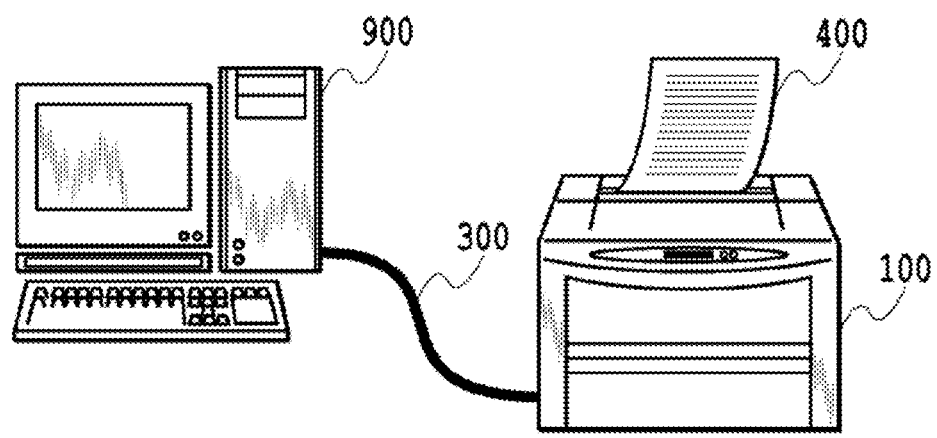
FIG. 4 is a diagram for explaining a connection configuration of a printer etc. according to an embodiment 1 of the present invention.

FIG. 4 shows a connection configuration of an image forming apparatus in the present embodiment.

A host computer 900 represented by the personal computer causes applications, such as PowerPoint described above, middleware, and driver software to run and generates PDL data 1000, which is input data. The PDL data 1000 will be described later. The host computer 900 and a printer 100 are connected to each other by a communication unit represented by a network 300. The host computer 900 transfers the PDL data 1000 to the printer 100 through the network 300. It is possible to embody the present invention also in the case where any of a USB interface device 100-7, an IEEE 1284 interface device 100-8, and a network device 100-9, which will be described later, is used as the network 300. It is needless to say that the present invention can be embodied by using, of course, a technique that connects devices and implements data transfer other than those described above.

On the other hand, the printer 100 uses the PDL data 1000 obtained through the communication unit represented by the network 300 and forms a visible image on a visible medium represented by paper 400. The processing to form a visible image on the paper 400 is generally called printing (hereinafter, the formation of a visible image is referred to as "printing" as a general term).

In the present embodiment, explanation is given using the case where the personal computer is used as the host computer 900 as an example. However, it is needless to say that the present invention can be embodied also in the case where a device capable of generating the PDL data 1000 or image data corresponding thereto and of transferring the data, as will be illustrated next is used other than the personal computer. In other words, it is possible to embody the present invention also in the case where a workstation, a main frame computer, a server, a smart phone, a PDA, a digital camera, or the like is used as the host computer 900.

Further, in the present embodiment, explanation is given using the case where the printer is used as the image forming apparatus as an example. However, it is possible to embody the present invention also in the case where an MFP (Multi Function Printer), a printing machine, electronic paper, or a device capable of forming a visible image, which is called a display device etc., is used as the image forming apparatus.
[Explanation of PDL Data]

Next, a structure of the PDL data 1000 in the present embodiment is explained with reference to FIG. 5A.

It is possible for the PDL data 1000 to have one or more PDL commands to be explained next. In other words, the PDL data 1000 can have a graphic drawing command 1000-1. Further, the PDL data 1000 can have a character drawing command 1000-2. Furthermore, the PDL data 1000 can have a raster bitmap drawing command 1000-3

The graphic drawing command 1000-1 is a drawing command of a figure that can be specified by geometric information. The geometric information that the PDL data 1000 can have includes segments on a two-dimensional plane and straight lines that can be represented by a set of segments. Further, the geometric information that the PDL data 1000 can have includes curves that can be represented by the blending function represented by Bezier curves on a two-dimensional plane. Further, the geometric information that the PDL data 1000 can have includes closed curves by a set including the segments and curves described above. Further, the geometric information that the PDL data 1000 can have includes color information inside the closed curve described above. Further, the geometric information that the PDL data 1000 can have includes gradation information inside the closed curve described above.

The geometric information that the PDL data 1000 can have may be information other than that mentioned above as examples. It is needless to say that the present invention can be embodied even in the case where a representation method of other curves, for example, such as spline curves, in place of the Bezier curves on a two-dimensional plane is used. Further, in the present embodiment, explanation is given with the examples described above as the geometric information that the PDL data 1000 can have, however, it is possible to embody the present invention even in the case where the PDL data 1000 not having part of the information is used.

The character drawing command 1000-2 is a command to draw a specified character.

The raster bitmap drawing command 1000-3 is a drawing command to draw a two-dimensional array having discrete color information. The raster bitmap drawing command 1000-3 can have ROP information, to be described later.

It is possible to embody the present invention also in the case where the PDL data 1000 has a command other than the graphic drawing command 1000-1, the character drawing command 1000-2, and the raster bitmap drawing command 1000-3.

Figure 5A:
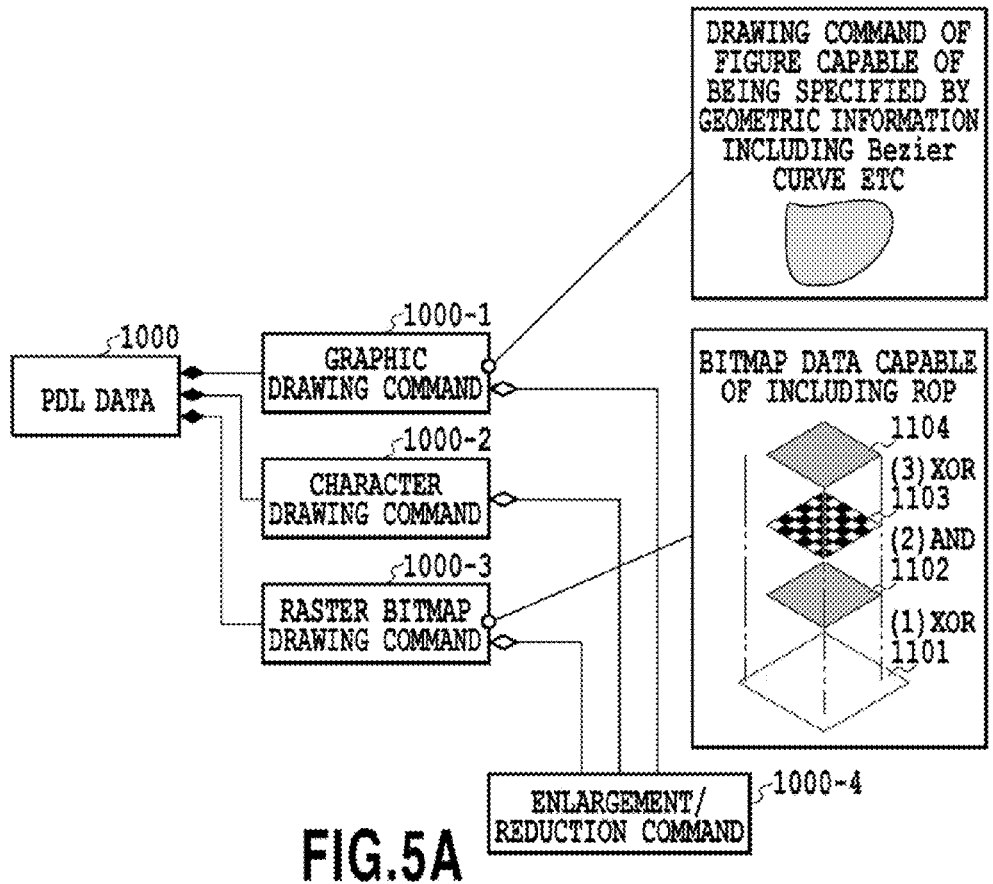
FIG. 5A and FIG. 5B are diagrams for explaining PDL data and intermediate data, respectively, according to the embodiment 1 of the present invention.

An enlargement/reduction command 1000-4 in FIG. 5A is a command to perform enlargement or reduction for any one of the graphic drawing command 1000-1, the character drawing command 1000-2, and the raster bitmap drawing command 1000-3. The enlargement/reduction command 1000-4 has an enlargement/reduction ratio indicating a ratio of enlargement or reduction.

Figure 16:
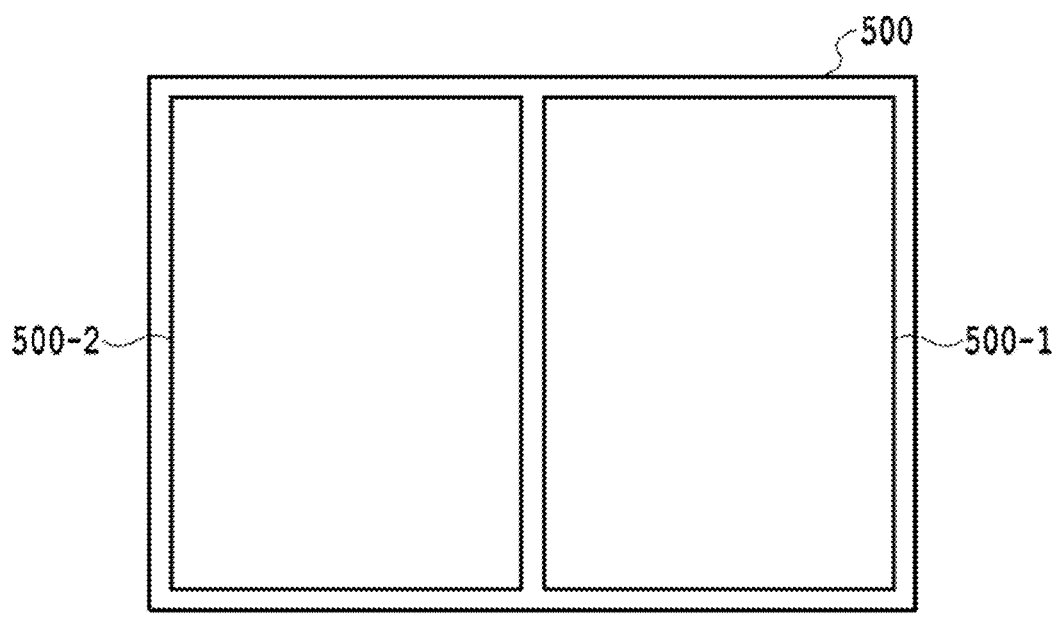
FIG. 16 is a diagram showing an example of enlargement/reduction processing according to the embodiment 1 of the present invention.

As an example of processing that uses the enlargement/reduction command 1000-4, mention is made of nUP processing. As shown in FIG. 16, the nUP processing is processing to reduce and arrange a plurality of pages 500-1 and 500-2 on the surface of one piece of the paper 500. In 2UP processing, which is part of the nUP processing, reduction processing by a factor of ½ is performed and two pages are arranged on one piece of paper. However, it is needless to say that the present invention can be embodied even in the case where the enlargement/reduction command is used in an example other than this example.

The data included in the PDL data 1000 is converted into intermediate data 2000 (see FIG. 5B) by processing, to be described later. Details of the intermediate data 2000 will be described later.

[Explanation of Host Computer]

Next, a structure of the host computer 900 in the present embodiment is explained with reference to FIG. 6.

Figure 6:
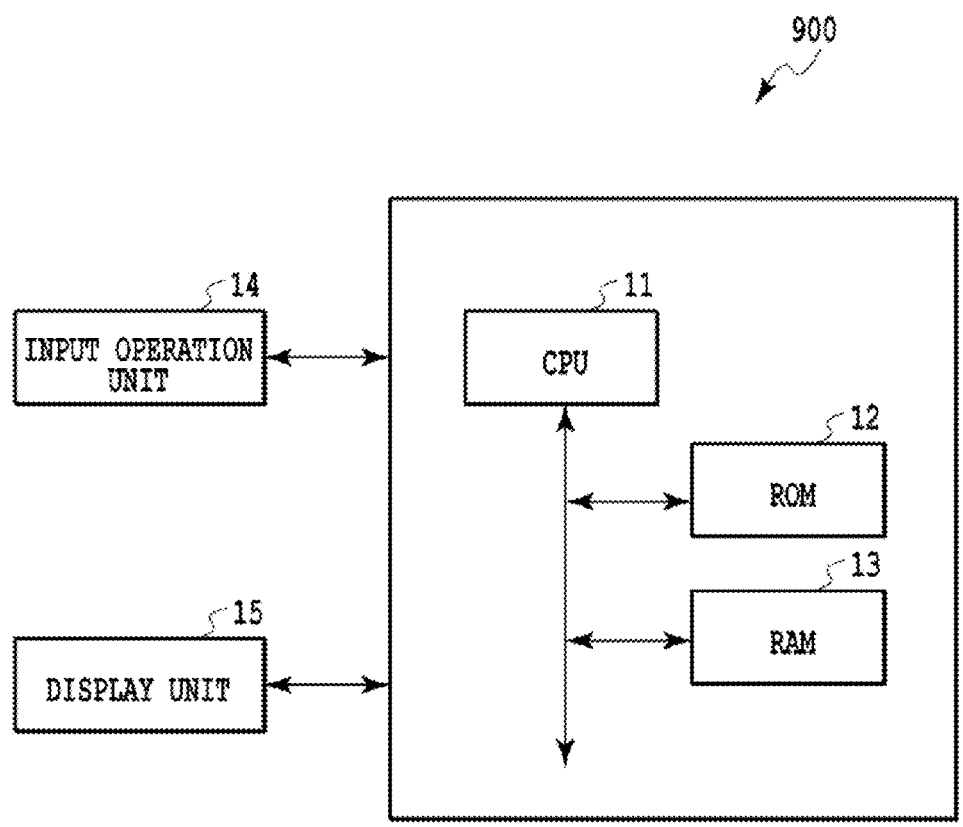
FIG. 6 is a diagram for explaining a structure of a host computer according to the embodiment 1 of the present invention.

As shown in FIG. 6, the host computer 900 includes a CPU 11, a ROM 12, and a RAM 13. The CPU 11 performs processing operations, such as various kinds of arithmetic operations, control, determinations, etc. The ROM 12 stores control programs etc. for the processing performed by the CPU 11. The RAM 13 temporarily stores data, input data, etc., during the processing operation of the CPU 11.

To the host computer 900, an input operation unit 14 and a display unit 15 are connected. The input operation unit 14 includes a keyboard or various kinds of switches with which to input predetermined instructions, data, etc. The display unit 15 displays various kinds of information on the input/setting state etc. of the host computer 900.

Further, it is possible for the host computer 900 to display a GUI to implement the previously-described WYSIWYG on the display unit 15. A user specifies translucency by performing the operation to specify translucency in the GUI via the input operation unit 14. Further, the user sets colors of various kinds of drawings by performing the color setting in the GUI via the input operation unit 14. Furthermore, the user sets various kinds of gradation by performing the gradation setting in the GUI via the input operation unit 14.

The method by which the host computer 900 acquires image data in the present invention may be any method. For example, it may also be possible for a user to create image data on a predetermined application by operating the input operation unit 14. Further, in the case where the host computer 900 includes a reading device of a medium that can be attached and detached, such as a magnetic disc and an optical disc, it may also be possible to input image data using a medium. Furthermore, in the case where there is provided a built-in image reading device, such as a scanner, or where an image reading device is connected via a network, it may also be possible to acquire image data by inputting image data read by the image reading device.

In the present embodiment, the host computer 900 reads programs from the ROM 12 and creates the PDL data 1000. Then, the host computer 900 transmits the created PDL data 1000 to an image forming apparatus, such as the printer 100. The image forming apparatus performs printing on the paper 400 based on the transmitted PDL data 1000. The image forming apparatus maybe integrated with the image processing apparatus into one unit, or maybe provided separately and connected with the image processing apparatus via a network etc.

[Generation Processing of Translucent Object]

Figure 7:
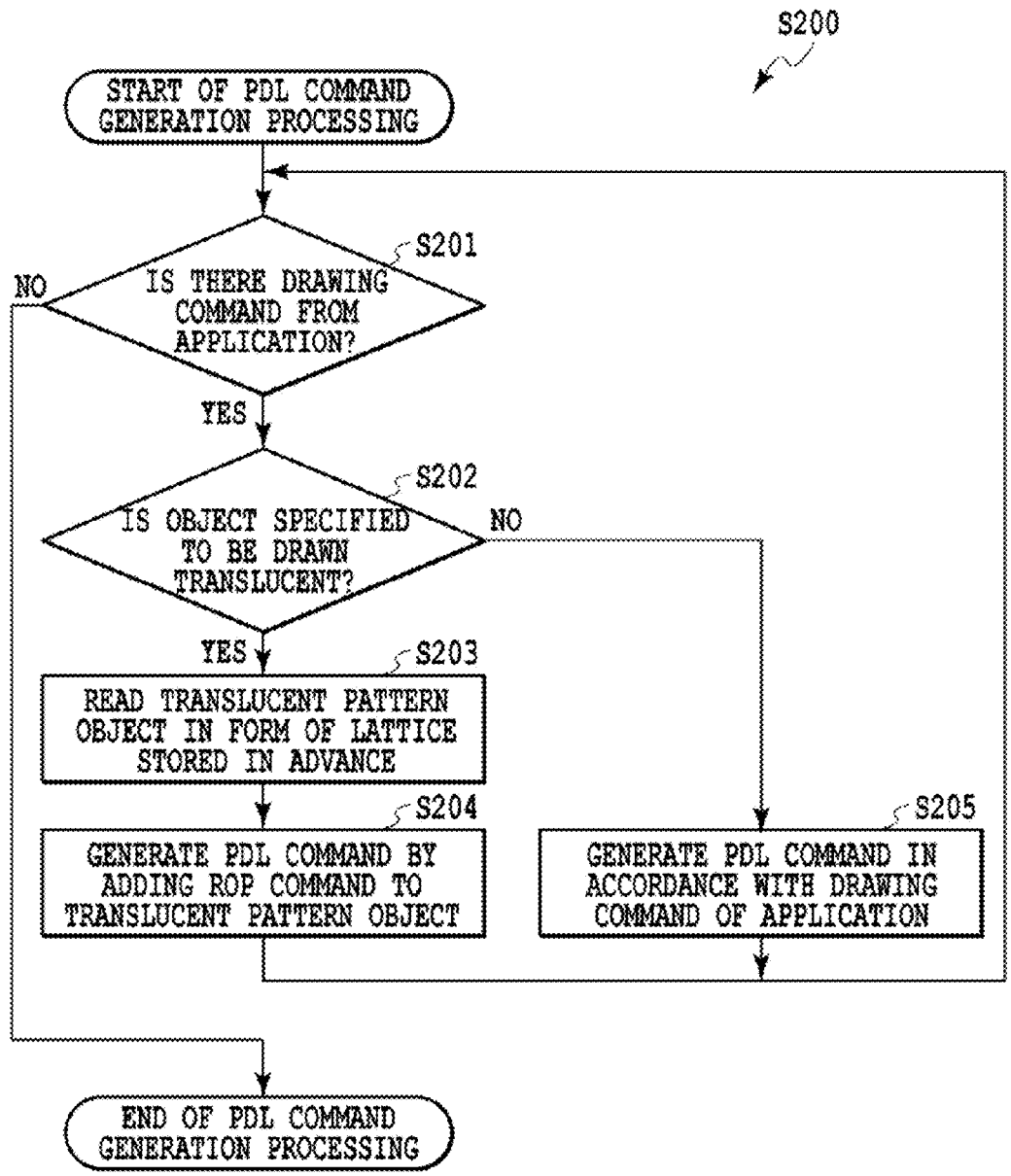
FIG. 7 is a flowchart for explaining PDL command generation processing in the host computer according to the embodiment 1 of the present invention.

Next, a generation procedure of the PDL data 1000 including a translucent object in the present embodiment is explained with reference to FIG. 7. In the present embodiment, for the sake of simplification of explanation, the case of monochrome printing is explained.

First, a user specifies a file to be printed from files displayed on the display unit 15 by a predetermined application of the host computer 900 via the input operation unit 14. The CPU 11 starts drawing by the application based on the specification.

Next, the CPU 11 performs PDL command generation processing (step S200) to generate the PDL data 1000 and generates one or more PDL commands. In the PDL command generation processing (step S200), the CPU 11 performs the following series of processing.

First, at step S201, the CPU 11 determines whether or not there is a drawing command based on drawing by the application. In the case where it is determined that there is a drawing command based on drawing by the application, the processing proceeds to step S202 and in the case where it is determined that there is no drawing command based on drawing by the application, the processing is ended.

At step S202, the CPU 11 determines whether or not there is an object specified to be drawn translucent in the drawing command. In the case where it is determined that there is an object specified to be drawn translucent in the drawing command, the processing proceeds to step S203 and in the case where it is determined that there is no object specified to be drawn translucent in the drawing command, the processing proceeds to step S205.

At step S203, the CPU 11 reads a translucent pattern object in the form of a lattice (e.g., in the form of a checkered pattern) stored in advance in the ROM 12. In the present embodiment, the translucent pattern is stored in the ROM 12 as data that can be determined uniquely for the transmittance of a translucent object. In other words, the CPU 11 generates the PDL data 1000 using data of a periodic drawing, such as a checkered pattern, that is found uniquely in accordance with the transmittance. Next, the processing proceeds to step S204.

At step S204, the CPU 11 generates a PDL command by combining the translucent pattern object and the ROP for the object specified to be drawn translucent and stores the PDL command in the RAM 13. Specifically, the CPU 11 generates a PDL command by a combination of the "XOR" specification of the ROP for the object specified to be drawn translucent, the "AND" specification of the ROP for the translucent pattern object, and further the "XOR" specification of the ROP for the object specified to be drawn translucent. Next, the processing returns to step S201.

At step S205, the CPU 11 generates a PDL command in accordance with the drawing command from the application. Next, the processing returns to step S201.

Figure 8A:
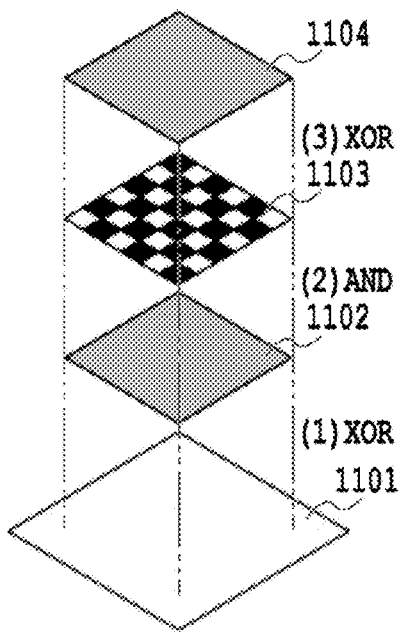
FIG. 8A and FIG. 8B are diagrams for explaining a drawing method of an object specified to be drawn translucent according to the embodiment 1 of the present invention.
Figure 8B:
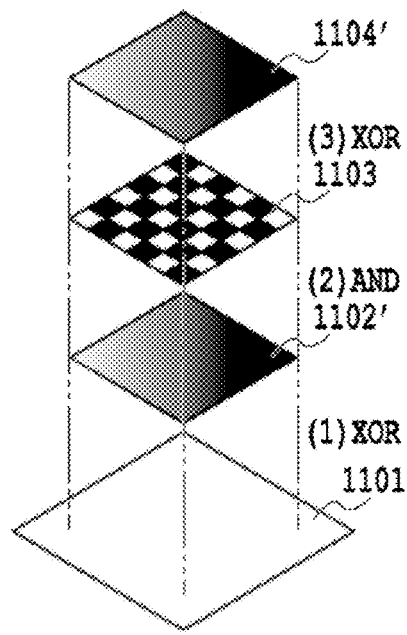

Next, the PDL command for an object specified to be drawn translucent is explained with reference to FIG. 8A and FIG. 8B. FIG. 8A shows a general drawing method of an object specified to be drawn translucent based on the drawing command from the application. First, an object 1102 specified to be drawn translucent is combined with a background 1101 by "XOR" of the ROP and on the object 1102, a translucent pattern object 1103 is combined by "AND" of the ROP, and further, on the translucent pattern object 1103, an object 1104 specified to be drawn translucent is combined by "XOR" of the ROP.

Next, the PDL command for the object specified to be drawn translucent is explained in more detail with reference to FIG. 9A to FIG. 9C.

Figure 9A:
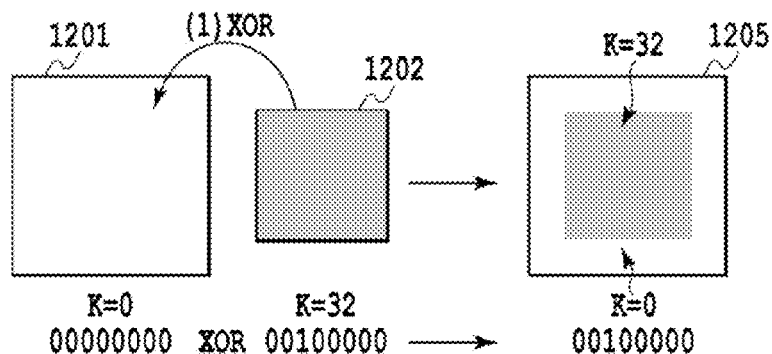
FIG. 9A, FIG. 9B, and FIG. 9C are diagrams for explaining a drawing method of an object specified to be drawn translucent according to the embodiment 1 of the present invention.

FIG. 9A is a diagram showing details of the processing to combine the background 1101 and the object 1102 specified to be drawn translucent by "XOR" of the ROP shown in FIG. 8A. A background 1201 with K=0 (in the bit pattern, "00000000") and an object 1202 with K=32 (in the bit pattern, "00100000") specified to be drawn translucent are combined by "XOR" of the ROP. As the result of combination, a combined image 1205 including a region of K=32 (in the bit pattern, "00100000") is obtained. Here, in the present embodiment, K is the density value. However, K is not limited to the density value and in another embodiment, K may be the luminance value.

Figure 9B:
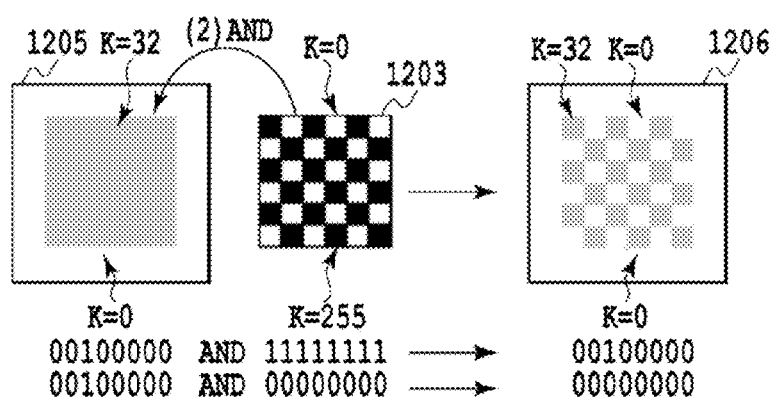

FIG. 9B is a diagram showing details of the processing to combine the translucent pattern object 1103 by "AND" of the ROP shown in FIG. 8A. The combined portion of the combined image 1205 (K=32, in the bit pattern, "00100000") and a translucent pattern object 1203 are combined by "AND" of the ROP. The translucent pattern object 1203 consists of the white portion (K=0, in the bit pattern, "00000000") and the black portion (K=255, in the bit pattern, "11111111"). As the result of combination, a combined image 1206 is obtained in which the white portion of the translucent pattern object 1203 is K=0 (in the bit pattern, "00000000") and the black portion is K=32 (in the bit pattern, "00100000").

Figure 9C:
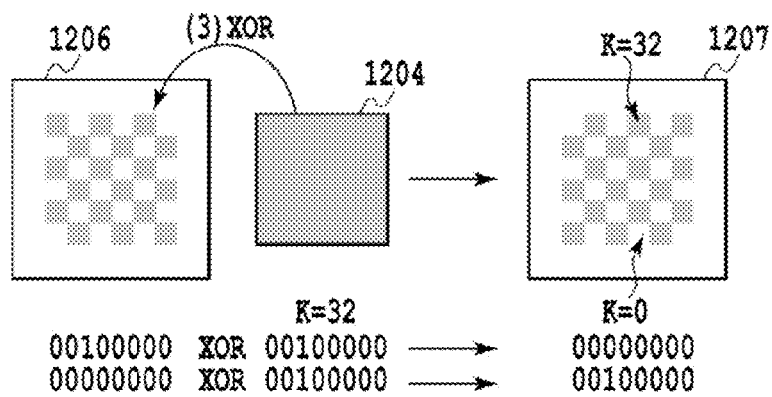

FIG. 9C is a diagram showing details of the processing to combine the object 1104 specified to be drawn translucent by "XOR" of the ROP shown in FIG. 8A. The combined portion of the combined image 1206 (K=32, in the bit pattern, "00100000") and an object 1204 (K=32, in the bit pattern, "00100000") specified to be drawn translucent are combined by "XOR" of the ROP. As the result of combination, the white portion (K=0, in the bit pattern, "00000000") is obtained. Further, the combined portion of the combined image 1206 (K=0, in the bit pattern, "00000000") and the object 1204 (K=32, in the bit pattern, "00100000") specified to be drawn translucent are combined by "XOR" of the ROP. As the result of combination, the portion with K=32 (in the bit pattern, "00100000") is obtained. By these arithmetic operations, a combined image 1207 is obtained and it is made possible to represent translucency of the object (K=32) specified to be drawn translucent.

In the above-described explanation, the translucency processing for the painting whose density is uniform is explained. In the case where the translucency processing is performed on an object, such as an image whose density is not uniform, it is only required to perform the processing to combine by "AND" on an image 1102' whose density is not uniform in place of the object 1102 with K=32 (see FIG. 8A and FIG. 8B).

The above-described processing is summarized below. The host computer 900 generates the "XOR" specification, the "AND" specification, and the "XOR" specification of the ROP, and a translucent pattern object in which black and white appear periodically in the same region in order to represent a translucent drawing by PDL commands. The translucent pattern object is generated by reading data saved in the ROM 12 within the host computer. In the present embodiment, this translucent pattern is stored in the ROM 12 as data that can be determined uniquely for the transmittance of a translucent object.

[Explanation of Devices within Printer]

As described above, in the present embodiment, the printer 100 acquires the PDL data 1000 generated by the host computer 900 and performs printing processing. In the following, various kinds of devices within the printer 100 are explained with reference to FIG. 10

The printer 100 includes a CPU 100-0, a RAM 100-1, an HDD 100-2, an ASIC 100-3, and an electrophotographic engine 100-4. Further, the printer 100 includes the USB interface device 100-7, the IEEE 1284 interface device 100-8, and the network device 100-9. Furthermore, the printer 100 includes a bus 100-6. The bus 100-6 connects the various kinds of devices described above and enables transmission and reception of data and commands between the devices.

The CPU 100-0 executes a software module 200 configured to implement PDL interpretation processing, to be described later, by executing commands saved in the RAM 100-1.

The RAM 100-1 is a volatile storage medium. It is possible for the RAM 100-1 to save the PDL data 1000 and commands to be executed by the CPU 100-0. Further, it is possible for the RAM 100-1 to transfer the PDL data 1000 and commands to be executed by the CPU 100-0 to the various kinds of devices including the CPU 100-0 through the bus 100-6. The RAM 100-1 is a volatile storage medium, and therefore, the saved commands and data are deleted in the case where the power source of the printer 100 is turned off.

The HDD 100-2 is a nonvolatile storage medium. It is possible for the HDD 100-2 to save the commands and data to be processed by the CPU 100-0, which are deleted from the RAM 100-1 in the case where the power source is turned off, by saving the commands and data to be processed by the CPU 100-0. In the present embodiment, the storage capacity of the HDD 100-2 is larger than that of the RAM. 100-1. Consequently, the HDD 100-2 is suitable to save a large capacity of data represented by image forming bitmap data 4000, to be described later. In the present embodiment, as a nonvolatile storage medium, the HDD is used, however, it is needless to say that the present invention can be embodied also in the case where a flash-type EEPROM, a ferroelectric memory (Fe-RAM), a magnetoresistive memory (MRAM), or the like is used in place of the HDD.

It is possible for the ASIC 100-3 to perform image processing, to be explained later.

The electrophotographic engine 100-4 forms a visible image on a visible medium represented by paper using the image forming bitmap data 4000 generated by the ASIC 100-3. In the present embodiment, a visible image is obtained on a visible medium using the electrophotographic engine, however, it is needless to say that the present invention can be embodied also in the case where mechanisms shown below other than the electrophotographic engine are used. In other words, the present invention can be embodied also in the case where a liquid crystal panel, an organic EL panel, a letter press printing engine, an offset printing electrophotographic engine, an inkjet printing electrophotographic engine, or the like is used in place of the electrophotographic engine.

The USB interface device 100-7 makes it possible to input the PDL data 1000 to the printer 100 from outside through an external device compliant with the USB standard.

The IEEE 1284 interface device 100-8 makes it possible to input the PDL data 1000 to the printer 100 from outside through an external device having hardware compliant with the IEEE 1284 standard.

The network device 100-9 makes it possible to input the PDL data 1000 to the printer 100 from outside through an external device having hardware compliant with the network standard.

It is possible to receive the PDL data 1000 within the printer 100 by the USB interface device 100-7, the IEEE 1284 interface device 100-8, and the network device 100-9 under the control of a communication control unit 200-0, to be described later.

[Explanation of Soft Module]

Next, the soft module 200 that runs on the CPU 100-0 is explained with reference to FIG. 11.

The soft module 200 includes the communication control unit 200-0, a PDL data processing unit 200-1, an image processing unit 200-2, an engine control unit 200-3, and a job controller unit 200-4.

The communication control unit 200-0 controls the USB interface device 100-7, the IEEE 1284 interface device 100-8, and the network device 100-9 and establishes a communication connection between the printer 100 and the host computer 900. Further, the communication control unit 200-0 enables reception of the PDL data 1000 by controlling the USB interface device 100-7, the IEEE 1284 interface device 100-8, and the network device 100-9. Furthermore, it is possible for the communication control unit 200-0 to cause the RAM 100-1 to record the received PDL data 1000.

The PDL data processing unit 200-1 performs interpretation processing on the PDL data 1000 recorded in the RAM 100-1 and generates continuous tone raster bitmap data 3000. Generation of the continuous tone raster bitmap data 3000 will be described later.

The image processing unit 200-2 generates the image forming bitmap data 4000 by using the continuous tone raster bitmap data 3000 generated by the PDL data processing unit 200-1 and the ASIC 100-3.

The engine control unit 200-3 performs image forming processing by using the image forming bitmap data 4000 and the electrophotographic engine 100-4.

The job controller unit 200-4 transfers information between the soft modules described above and transfers a processing flow. Due to this, the job controller unit 200-4 implements the image forming processing represented by printing of the printer 100.

[Data Flow of PDL Data]

Figure 10:
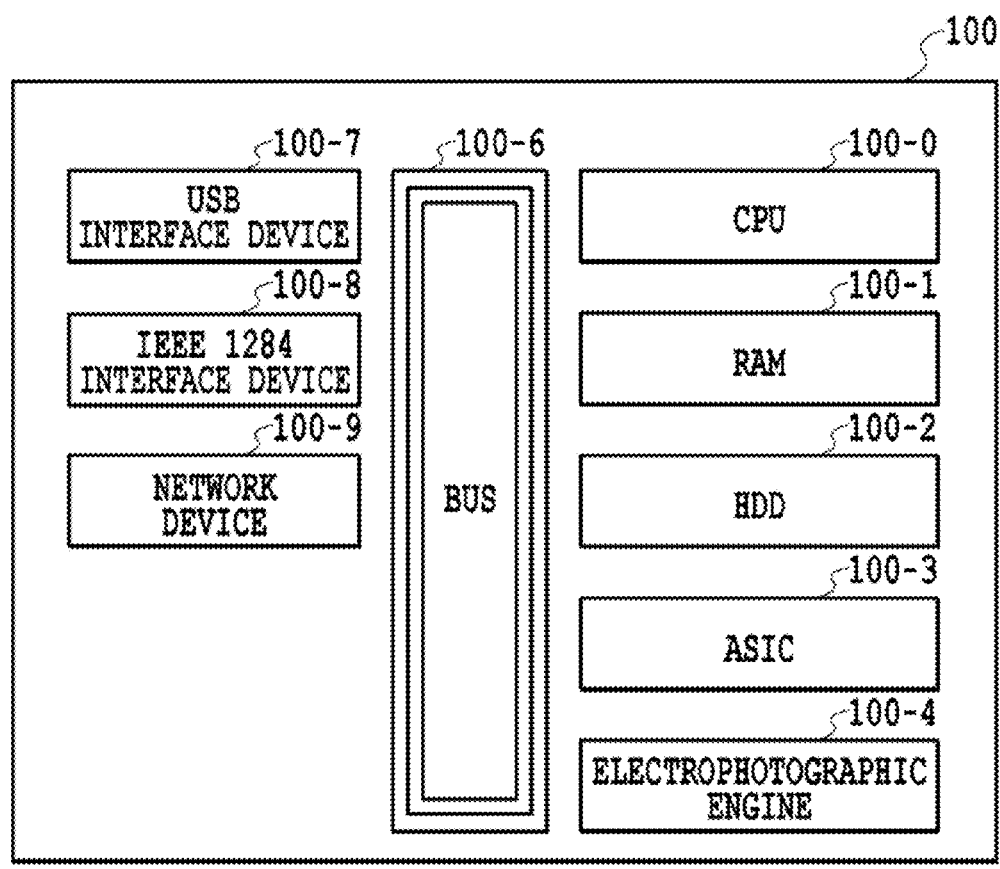
FIG. 10 is a block diagram for explaining a hardware configuration within a printer according to the embodiment 1 of the present invention.
Figure 11:
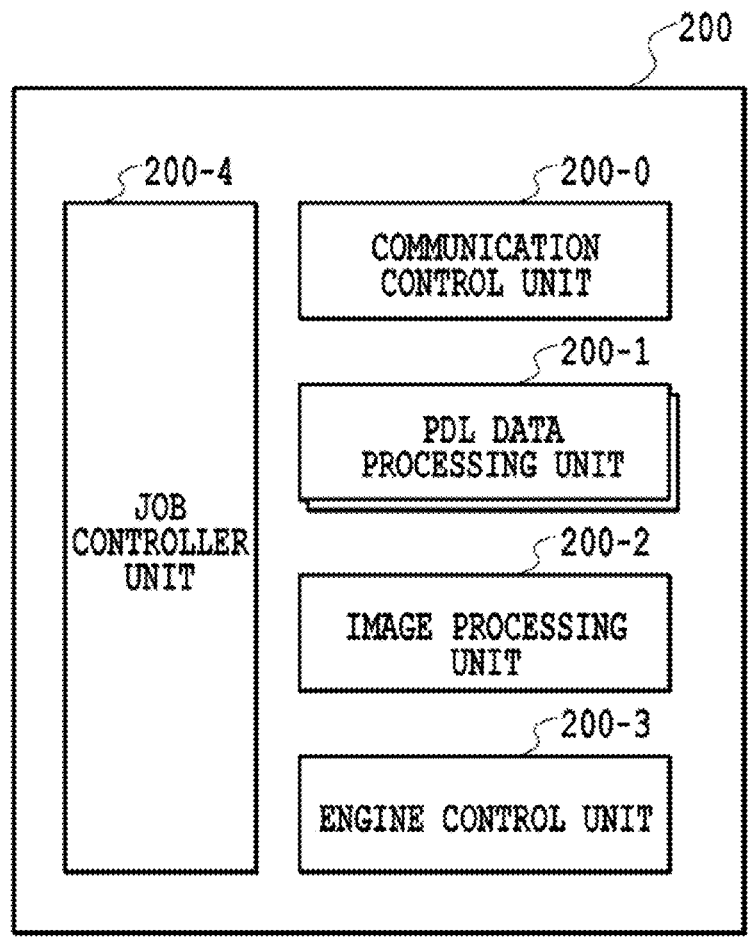
FIG. 11 is a block diagram for explaining a software configuration within a printer according to the embodiment 1 of the present invention.
Figure 12:
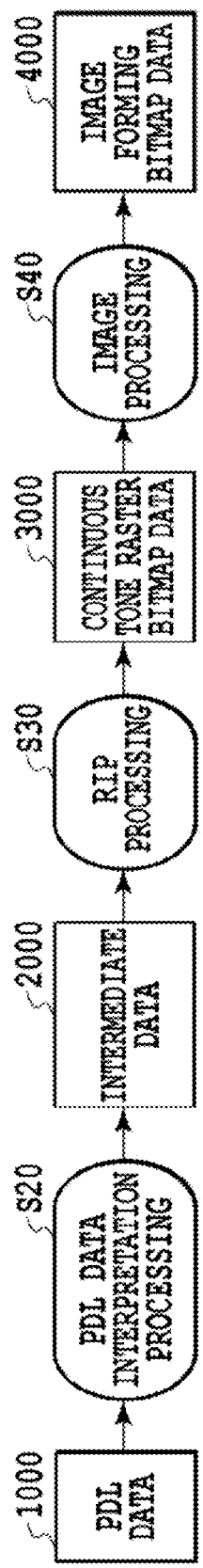
FIG. 12 is a diagram for explaining a data flow within a printer according to the embodiment 1 of the present invention.

Next, which processing is performed on the PDL data 1000 by the various kinds of devices within the printer explained in FIG. 10 and the software module group explained in FIG. 11 is explained with reference to FIG. 12.

In the present embodiment, the printer 100 receives the PDL data 1000 as input data via the USB interface device 100-7, the IEEE 1284 interface device 100-8, or the network device 100-9. The received PDL data 1000 is saved in the RAM 100-1 or in the HDD 100-2 by the job controller unit 200-4.

Figure 5B:
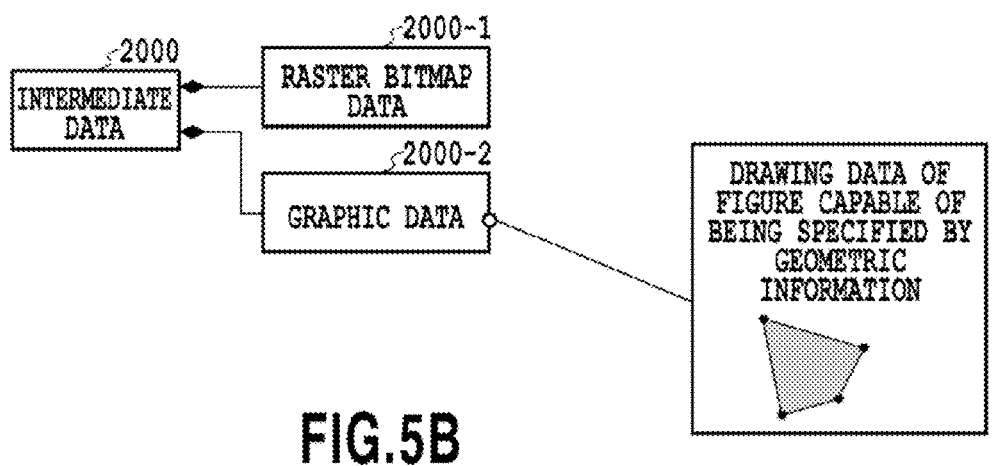

Next, the PDL data processing unit 200-1 performs interpretation processing on the PDL data 1000 under the control of the job controller unit 200-4 on the CPU 100-0 and generates the intermediate data 2000 (step S20). It is possible for the intermediate data 2000 to have raster bitmap data 2000-1 and graphic data 2000-2 as shown in FIG. 5B. These pieces of data are generated by the CPU 100-0 converting the drawing commands 1000-1, 1000-2, and 1000-3 in the PDL data 1000.

Next, the PDL data processing unit 200-1 performs interpretation processing on the intermediate data 2000 under the control of the job controller unit 200-4 on the ASIC 100-3 and generates the continuous tone raster bitmap data 3000 (step S30). The generation processing of the continuous tone raster bitmap data 3000 is called RIP processing. In the RIP processing (step S30), the PDL data processing unit 200-1 interprets the raster bitmap data 2000-1 and the graphic data 2000-2 included in the intermediate data 2000 and generates the continuous tone raster bitmap data 3000. Further, the PDL data processing unit 200-1 saves the continuous tone raster bitmap data 3000 in the RAM 100-1. In the present embodiment, the RIP processing (step S30) is performed on the ASIC 100-3, however, it is needless to say that the present invention can be embodied even in the case where the RIP processing is performed on the CUP 100-0.

Next, the image processing unit 200-2 performs image processing on the input continuous tone raster bitmap data 3000 on the ASIC 100-3 and generates the image forming bitmap data 4000 (step S40). The generated image forming bitmap data 4000 is saved in the RAM 100-1 by the ASIC 100-3. This image processing (step S40) includes dither processing. The engine control unit 200-3 performs printing based on the image forming bitmap data 4000 by using the electrophotographic engine 100-4 under the control of the job controller unit 200-4. In the present embodiment, the image processing (step S40) is performed on the ASIC 100-3, however, it is needless to say that the present invention can be embodied even in the case where the image processing is performed on the CPU 100-0.

[Processing within Printer on Periodic Drawing Pattern]

Hitherto, the outline of the generation processing of the image forming bitmap data 4000 performed within the printer 100 is explained.

Figure 13:
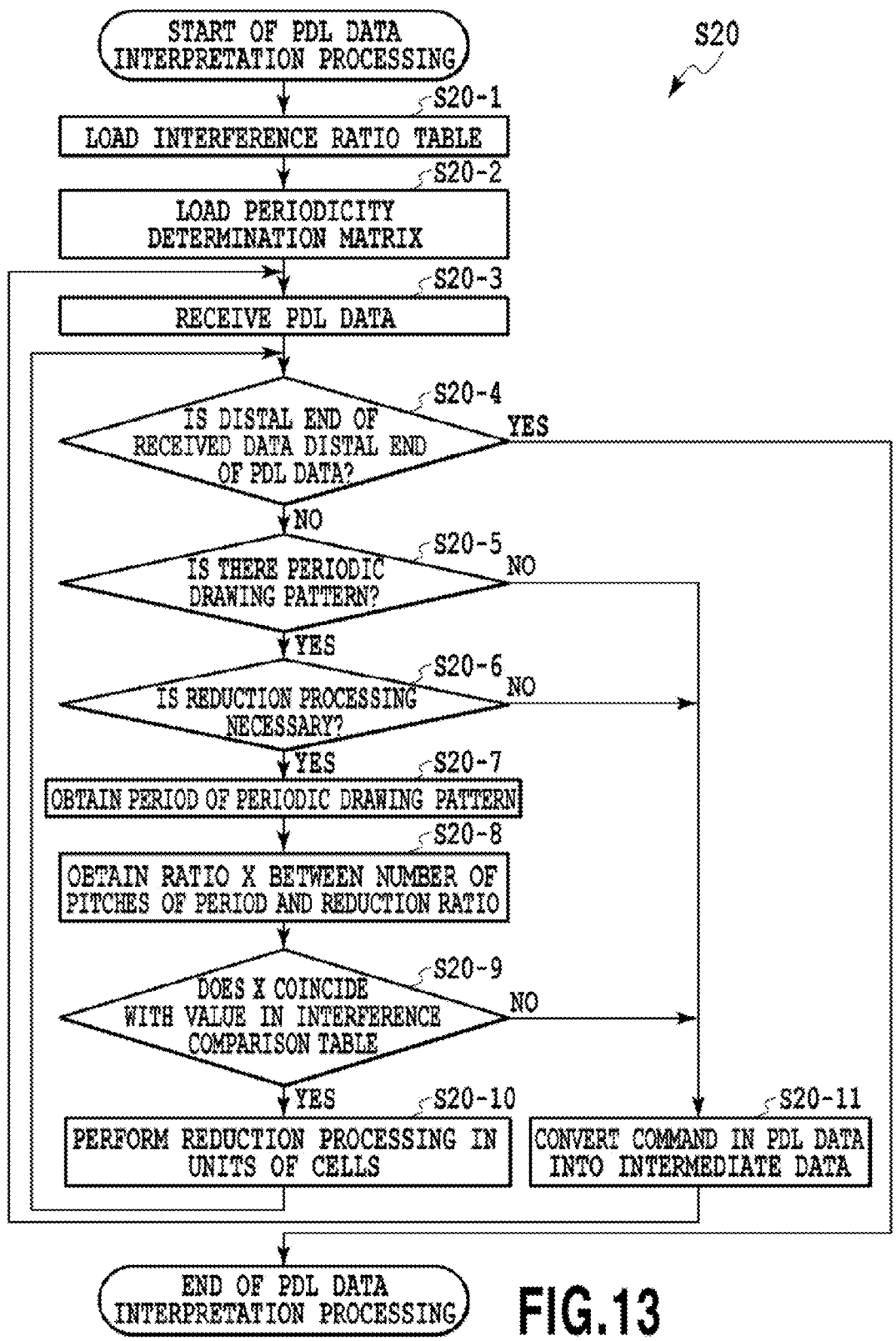
FIG. 13 is a flowchart for explaining enlargement/reduction processing on a pattern of a periodic drawing according to the embodiment 1 of the present invention.

Next, the processing within the printer 100 on a periodic drawing pattern in the PDL data interpretation processing (step S20) described above is explained in detail with reference to FIG. 13.

Figure 14:
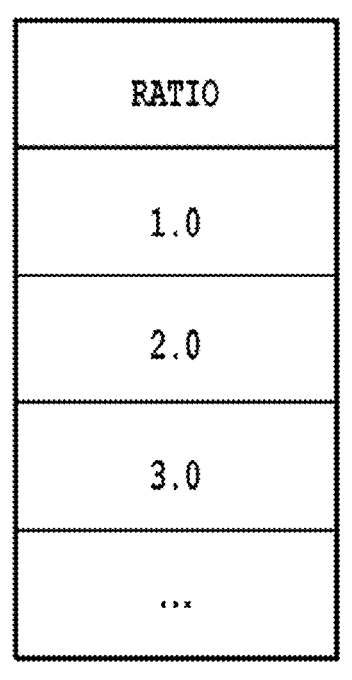

First, at step S20-1, the PDL data processing unit 200-1 loads an interference ratio table. This processing is implemented by the CPU 100-0 copying the data saved in advance in the HDD 100-2 to the RAM 100-1. The interference ratio table is aggregated data, to be described later, including ratios with which there is a possibility that an image is not drawn correctly among ratios between the period of a periodic drawing pattern and the reduction ratio. FIG. 14 illustrates data saving ratios with which there is a possibility that an image is not drawn correctly among ratios between the period of a periodic drawing pattern and the reduction ratio. In the present embodiment, by saving in advance ratios with which interference may occur in the HDD 100-2 as shown in FIG. 14, processing to determine whether or not to perform processing to avoid interference, to be described later, is performed.

Figure 15:
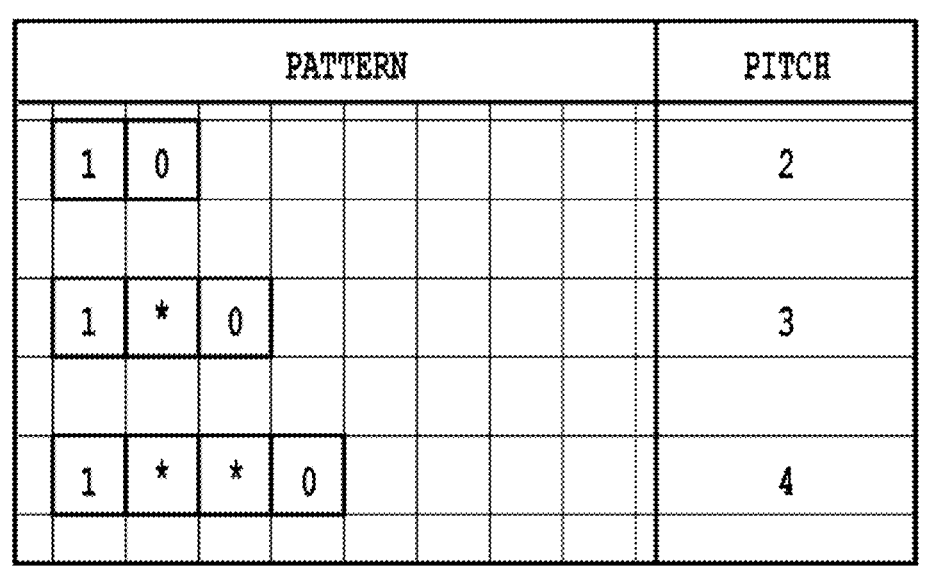

Next, at step S20-2, the PDL data processing unit 200-1 loads a periodicity determination matrix. This processing is implemented by the CPU 100-0 copying the data saved in advance in the HDD 100-2 to the RAM 100-1. FIG. 15 is a diagram illustrating the periodicity determination matrix. In the example shown in FIG. 15, the periodicity determination matrix has three kinds of pieces of painting-out pattern information in the pattern section. By using this information, the processing to determine whether or not the drawing contents have periodicity, to be described later, is performed. In the pattern section in FIG. 15, "1" indicates painting-out in a certain color and "0" indicates white. In FIG. 15, "*" indicates an arbitrary drawing, which may be "0" or "1". The PDL data processing unit 200-1 determines whether or not the drawing contents have periodicity by using information represented by "0", "1", and "*". Further, as shown in FIG. 15, the periodicity determination matrix has values each indicating the period for each pattern in the pitch section. This value is a value representing the period for each pattern indicated by "0", "1", and "*" described above by the number of pixels. The number of pixels is used in the processing to obtain the period of a pattern, to be described later, performed by the PDL data processing unit 200-1. In the present embodiment, as the periodicity determination matrix, the example in which the one-dimensional array is used is shown, however, it is needless to say that the present invention can be embodied also in the case where a two-dimensional array is used.

Next, at step S20-3, the PDL data processing unit 200-1 receives the PDL data 1000. This processing is implemented by the CPU 100-0 saving part of the PDL data 1000 in a buffer area generated on the RAM 100-1.

Next, at step S20-4, the PDL data processing unit 200-1 determines whether or not the distal end of the data received in the PDL data reception processing (step S20-3) is the distal end of the PDL data 1000. In the case where the reception of the PDL data 1000 is completed and it is determined that the distal end of the received data is the data distal end of the PDL data 1000, the PDL data interpretation processing is ended. In the case where the reception of the PDL data 1000 is not completed yet and it is determined that the distal end of the received data is not the data distal end of the PDL data 1000, the processing proceeds to step S20-5.

At step S20-5, the PDL data processing unit 200-1 determines whether or not there is a periodic drawing pattern in the received PDL data. In this determination processing, first, the PDL data processing unit 200-1 determines whether or not the PDL data 1000 includes the raster bitmap drawing command 1000-3. Then, in the case where it is determined that the PDL data 1000 includes the raster bitmap drawing command 1000-3, the PDL data processing unit 200-1 determines whether or not there is a pattern by performing processing to detect a pattern using the periodicity determination matrix. In the case where both the two determination results are affirmative, it is determined that there is a periodic drawing pattern in the PDL data 1000. In the present embodiment, the pattern detection processing is implemented by pattern matching between the periodicity determination matrix and the above-described pattern object 304 in the PDL data 1000. In the case where it is determined that there is no periodic drawing pattern by the determination at step S20-5, the processing proceeds to step S20-11. In the case where it is determined that there is a periodic drawing pattern by the determination at step S20-5, the processing proceeds to step S20-6.

At step S20-6, the PDL data processing unit 200-1 determines whether or not reduction processing is necessary on the periodic drawing pattern. In this determination processing, in the case where the PDL data 1000 has the enlargement/reduction command 1000-4 and the enlargement/reduction ratio is less than 1, the PDL data processing unit 200-1 determines that reduction processing is necessary. In the case where it is determined that reduction processing is necessary by the determination at step S20-6, the processing proceeds to step S20-7. In the case where it is determined that reduction processing is not necessary by the determination at step S20-6, the processing proceeds to step S20-11.

At step S20-7, the PDL data processing unit 200-1 obtains the period of the periodic drawing pattern. The processing to obtain the period is performed using the table used in the processing to compare the object pattern with the periodicity determination matrix for pattern matching at step S20-5. In other words, the PDL data processing unit 200-1 saves the number of pitches corresponding to the pattern matched at step S20-5 in the RAM 100-1 as the period of the drawing pattern. See FIG. 15 and the explanation of step S20-2 described above for the correspondence relationship between the pattern and the number of pitches.

At step S20-8, the PDL data processing unit 200-1 obtains the ratio between the number of pitches of the period of the drawing pattern and the reduction ratio. This processing is implemented by dividing the number of pitches of the period saved in the RAM 100-1 by the enlargement/reduction ratio held by the enlargement/reduction command 1000-4. In the case where the ratio between the number of pitches of the period of the drawing pattern and the reduction ratio is taken to be X, X is found by (Expression 1) below.

$$X = L/R \quad \text{(Expression 1)}$$

Here, L is the number of pitches of the period of the drawing pattern and R is the enlargement/reduction ratio.

At step S20-9, the PDL data processing unit 200-1 determines whether or not the ratio X between the number of pitches of the period of the drawing pattern and the reduction ratio coincides with a value in the interference ratio table as shown in FIG. 14. This processing is implemented by the PDL data processing unit 200-1 sequentially searching for values in the interference ratio table and determining whether or not there is a value that coincides with X. In the case where it is determined that X coincides with a value in the interference ratio table, the processing proceeds to step S20-10. The processing at step S20-10 will be explained in detail in the chapter of "Reduction processing in units of cells". In the case where it is determined that X does not coincide with any value in the interference ratio table, the processing proceeds to step S20-11.

At step S20-11, the PDL data processing unit 200-1 generates the intermediate data 2000 based on the processing explained in the chapter of "Data flow of PDL data" described above. Next, the processing returns to S20-3

The PDL data processing unit 200-1 generates the intermediate data 2000 by repeatedly performing the series of processing described above up to the last end of the PDL data 1000.

[Reduction Processing in Units of Cells]

Next, the "Reduction processing in units of cells" performed at step S20-10 described above is explained with reference to FIG. 17A to FIG. 17C and FIG. 18A.

FIG. 17A to FIG. 17C show the reduction processing in units of cells by taking the case where the number of pitches of the period is five and the enlargement/reduction ratio is 1/5 as an example. FIG. 17A shows an image before reduction and the image consists of pixels 600. In the present specification, pixels put together in the number corresponding to the number of pitches of the period are called a cell 601. As shown in FIG. 17A, in the case where the number of pitches of the period is five, each set of five pixels put together is called a cell.

Figures 18A, 18B:
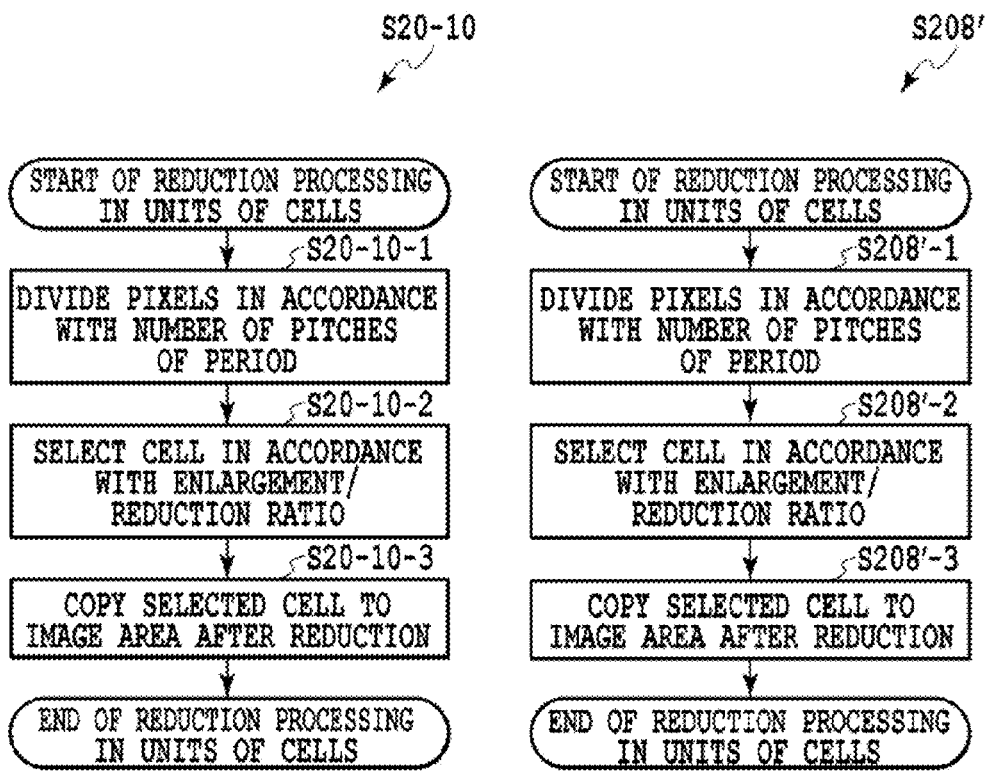
FIG. 18A and FIG. 18B are flowcharts for explaining reduction processing by thinning according to the present invention.

FIG. 18A is a flowchart of the detailed operation performed in the reduction processing in units of cells (step S20-10).

First, at step S20-10-1, the PDL data processing unit 200-1 divides the image to be reduced into cells in accordance with the number of pitches of the period. For example, in the case where the number of pitches of the period is five, the PDL data processing unit 200-1 divides the image to be reduced into units called "cell" for each set of five pixels.

Next, at step S20-10-2, the PDL data processing unit 200-1 selects a cell in accordance with the enlargement/reduction ratio. This processing is implemented by selecting one cell for each set of four cells in the case where the enlargement/reduction ratio is 1/4. In the examples shown in FIG. 17B and FIG. 17C, from among a cell 601-1 to a cell 601-4, the cell 601-1 is selected. In this manner, in the present embodiment, thinning processing in accordance with the enlargement/reduction ratio is performed in units of cells, not in units of pixels.

Next, at step S20-10-3, the PDL data processing unit 200-1 saves the cell selected by the thinning processing in the RAM 100-1 as the reduced image. After this processing, the PDL data processing unit 200-1 ends the reduction processing in units of cells (step S20-10).

[Effect of Embodiment 1]

By the present embodiment, it is possible to prevent a problem of a deterioration in the quality of drawing in the case where the drawing processing of a spatial periodicity drawing object and the enlargement/reduction processing interfere with each other.

Further, by the present embodiment, it is possible to prevent a problem of a deterioration in the quality of drawing while performing high-rate thinning processing in the reduction processing.

In the following, specific explanation is given. It is possible to determine presence/absence of the periodicity of an image by using the Fourier analysis, which is the publicly-known technique. In the present embodiment, pattern matching is performed in place of the Fourier analysis, and therefore, the Fourier analysis processing is not performed. Pattern matching is comparison and branching processing in the RAM 100-1 and can normally be performed in a time of about two cycles. In contrast to this, the Fourier analysis processing requires multiplications corresponding to the number of times expressed by (Expression 2) below in the case where the period is N even by using the FFT.

$$N \cdot \log 2N/2 \tag{Expression 2}$$

In the present embodiment, patterns of objects that may be included in the PDL data 1000 sent from the host computer 900 are utilized in order to find periodicity (step S20-5). Due to this, the processing of a very large number of calculations is omitted and thereby a high rate is implemented.

[Embodiment 2]

A second embodiment (embodiment 2) of the present invention is explained with the differences from the embodiment 1 being explained mainly.

In the embodiment 1, the PDL data processing unit 200-1 determines whether or not there is a periodic drawing pattern in the PDL data 1000 using the table saved in advance in the printer 100 (step S20-5). In addition to this, the PDL data processing unit 200-1 determines whether or not the PDL data 1000 includes the enlargement/reduction command 1000-4 (step S20-6). After the processing, the PDL data processing unit 200-1 performs the reduction processing in units of cells (step S20-10). Even in the case where the reduction processing in units of cells is performed by the host computer 900, it is possible to embody the present invention. In this case, the host computer 900 functions as the image forming apparatus for interpreting the PDL data 1000 to generate the intermediate data 2000.

Consequently, in the present embodiment, the case where the host computer 900 performs the reduction processing in units of cells is explained with differences from the embodiment 1 being explained mainly. In the present embodiment also, as in the embodiment 1, for the sake of simplification of explanation, the case of monochrome printing is explained.

[Generation Processing of Translucent Object]

Figure 19:
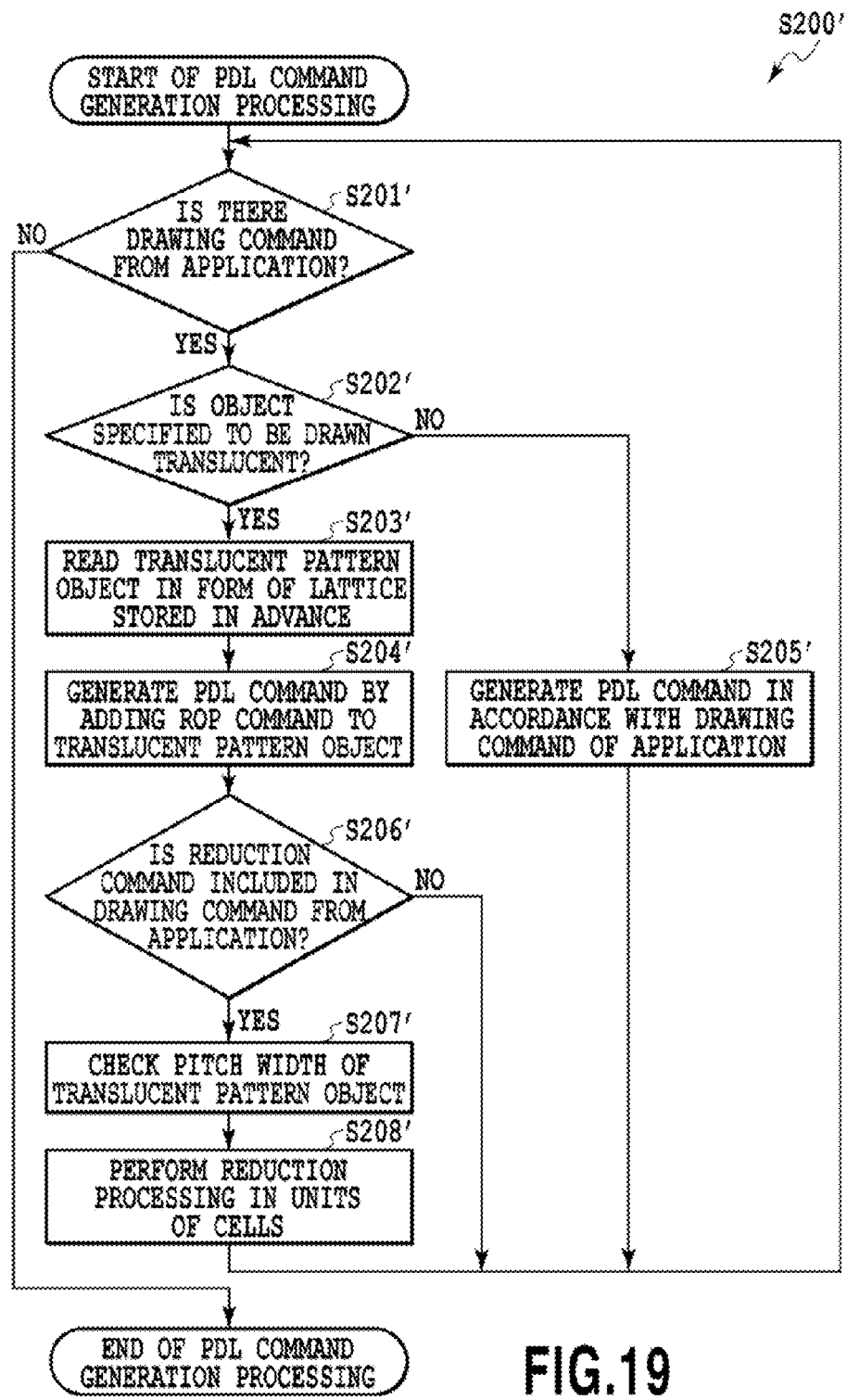
FIG. 19 is a diagram for explaining PDL data generation processing according to an embodiment 2 of the present invention.

A creation procedure (step S200') of the PDL data 1000 in the host computer 900 is explained with reference to FIG. 6 and FIG. 19. In the present embodiment also, for the sake of simplification of explanation, the case of monochrome printing is explained as in the embodiment 1.

First, a user specifies a file to be printed from files displayed on the display unit 15 by a predetermined application of the host computer 900 via the input operation unit 14. The CPU 11 starts drawing by the application based on the specification.

Next, the CPU 11 performs PDL command generation processing (step S200') to generate the PDL data 1000 and generates one or more PDL commands. In the PDL command generation processing (step S200'), the CPU 11 performs the following series of processing.

First, at step S201', the CPU 11 determines whether or not there is a drawing command based on drawing by the application. In the case where it is determined that there is a drawing command based on drawing by the application, the processing proceeds to step S202' and in the case where it is determined that there is no drawing command based on drawing by the application, the processing is ended.

At step S202', the CPU 11 determines whether or not there is an object specified to be drawn translucent in the drawing command. In the case where it is determined that there is an object specified to be drawn translucent in the drawing command, the processing proceeds to step S203' and in the case where it is determined that there is no object specified to be drawn translucent in the drawing command, the processing proceeds to step S205'.

At step S203', the CPU 11 reads a translucent pattern object in the form of a lattice (e.g., in the form of a checkered pattern) stored in advance in the ROM 12. In the present embodiment, the translucent pattern is stored in the ROM 12 as data that can be determined uniquely for the transmittance of a translucent object. Next, the processing proceeds to step S204'.

At step S204', the CPU 11 generates a PDL command by combining the translucent pattern object and the ROP for the object specified to be drawn translucent and stores the PDL command in the RAM 13. Specifically, the CPU 11 generates a PDL command by a combination of the "XOR" specification of the ROP for the object specified to be drawn translucent, the "AND" specification of the ROP for the translucent pattern object, and further the "XOR" specification of the ROP for the object specified to be drawn translucent. Next, the processing proceeds to step S206'.

At step S205', the CPU 11 generates a PDL command in accordance with the drawing command from the application. Next, the processing returns to step S201'.

At step S206', the CPU 11 determines whether or not the drawing command from the application includes the reduction command. In the case where it is determined that the drawing command from the application includes the reduction command, the processing proceeds to step S207' and in the case where it is determined that the drawing command from the application does not include the reduction command, the processing returns to step S201'.

At step S207', the CPU 11 checks the pitch width of the translucent pattern object. This processing is implemented by reading the pixel width of the pattern of the translucent pattern object in the form of a lattice stored in advance in the ROM 12. The CPU 11 saves the read pixel width in the RAM 13 as the pitch width of the translucent pattern object. Next, the processing proceeds to step S208'.

At step S208', the CPU 11 performs the reduction processing in units of cells on the translucent object. Although the reduction processing in units of cells is the processing equivalent to the "Reduction processing in units of cells" in the embodiment 1, it will be briefly explained later. Next, the processing returns to step S201'.

[Reduction Processing in Units of Cells]

Next, the "Reduction processing in units of cells" performed at step S208' described above is explained with reference to FIG. 18B.

FIG. 18B is a flowchart of the detailed operation performed in the reduction processing in units of cells (step S208').

First, at step S208'-1, the CPU 11 divides an image to be reduced into cells in accordance with the number of pitches of the period. For example, in the case where the number of pitches of the period is five, the CPU 11 divides the image to be reduced into units called "cell" for each set of five pixels.

Next, at step S208'-2, the CPU 11 selects a cell in accordance with the enlargement/reduction ratio. This processing is implemented by selecting one cell for each set of four cells in the case where the enlargement/reduction ratio is ¼. In the present embodiment, the publicly-known thinning processing in accordance with the enlargement/reduction ratio is performed in units of cells, not in units of pixels.

Next, at step S208'-3, the CPU 11 saves the cell selected in the thinning processing in the RAM 13 as the reduced image. After the processing, the CPU 11 ends the reduction processing in units of cells (step S208').

By the present embodiment, it is possible to implement the effect of the present invention even in the case where the PDL data processing unit 200-1 does not perform the reduction processing in units of cells (step S20-10).

In other words, in the present embodiment, the PDL data 1000 received by the PDL data processing unit 200-1 and executed on the CPU 100-0 within the printer 100 does not include the enlargement/reduction command (1000-4) that requires the reduction processing. Because of this, the reduction processing in units of cells (step S20-10) on the printer 100 side is no longer necessary.

[Effect of Embodiment 2]

By the present embodiment, in addition to the effect of the embodiment 1, it is possible to perform the reduction processing in units of cells at a higher rate in the case where the CPU 11 of the host computer 900 has a rate higher than that of the CPU 100-0 of the printer 100.

[Other Embodiments]

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-127780, filed Jun. 18, 2013, which is hereby incorporated by reference herein in its entirety.

What is claimed is:

1. An image forming apparatus for interpreting data to generate intermediate data, the image forming apparatus comprising:
   a unit configured to determine whether or not there is a periodic drawing pattern in data;
   a unit configured to determine whether or not there is a reduction command in data;
   a unit configured to obtain, in a case where it is determined that there is a periodic drawing pattern in data and that there is a reduction command in data, a ratio between the number of pitches of the period of the drawing pattern and a reduction ratio included in the reduction command;
   a unit configured to determine whether or not the ratio and a value in a table loaded by the image forming apparatus coincide with each other; and
   a unit configured to reduce, in a case where it is determined that the ratio coincides with a value in the table, an image by dividing the image into cells and performing thinning processing in units of cells.

2. The image forming apparatus according to claim 1, wherein
   the cell consists of pixels put together in the number corresponding to the number of pitches of the period of the pattern.

3. The image forming apparatus according to claim 1, wherein
   the data is PDL data.

4. An image forming apparatus, comprising:
   a determining unit configured to determine, in a case where an instruction to reduce a translucent object is inputted, a periodic drawing pattern in the translucent object; and
   a reducing unit configured to reduce the translucent object by thinning from the translucent object in units according to the periodic drawing pattern determined by the determining unit.

5. An image processing method for, by an image forming apparatus, interpreting data to generate intermediate data, the image processing method comprising the steps of:
   determining whether or not there is a periodic drawing pattern in data;
   determining whether or not there is a reduction command in data;
   obtaining, in a case where it is determined that there is a periodic drawing pattern in data and that there is a reduction command in data, a ratio between the number of pitches of the period of the drawing pattern and a reduction ratio included in the reduction command;
   determining whether or not the ratio and a value in a table loaded by the image forming apparatus coincide with each other; and
   reducing, in a case where it is determined that the ratio coincides with a value in the table, an image by dividing the image into cells and performing thinning processing in units of cells.

6. A non-transitory computer readable storage medium storing a program for causing a computer to function as the image forming apparatus according to claim 1.

* * * * *